3,576,603
HYDROGEN MANUFACTURE USING GAS TUR-
BINE DRIVEN CENTRIFUGAL COMPRESSORS
Calvin S. Smith and William J. McLeod, El Cerrito, Calif.,
assignors to Chevron Research Company, San Fran-
cisco, Calif.
Continuation-in-part of application Ser. No. 736,520, May
17, 1968, which is a continuation-in-part of application
Ser. No. 665,106, Sept. 1, 1967. This application Apr.
1, 1969, Ser. No. 812,266
Int. Cl. C01b 1/16, 1/03
U.S. Cl. 23—212                               4 Claims

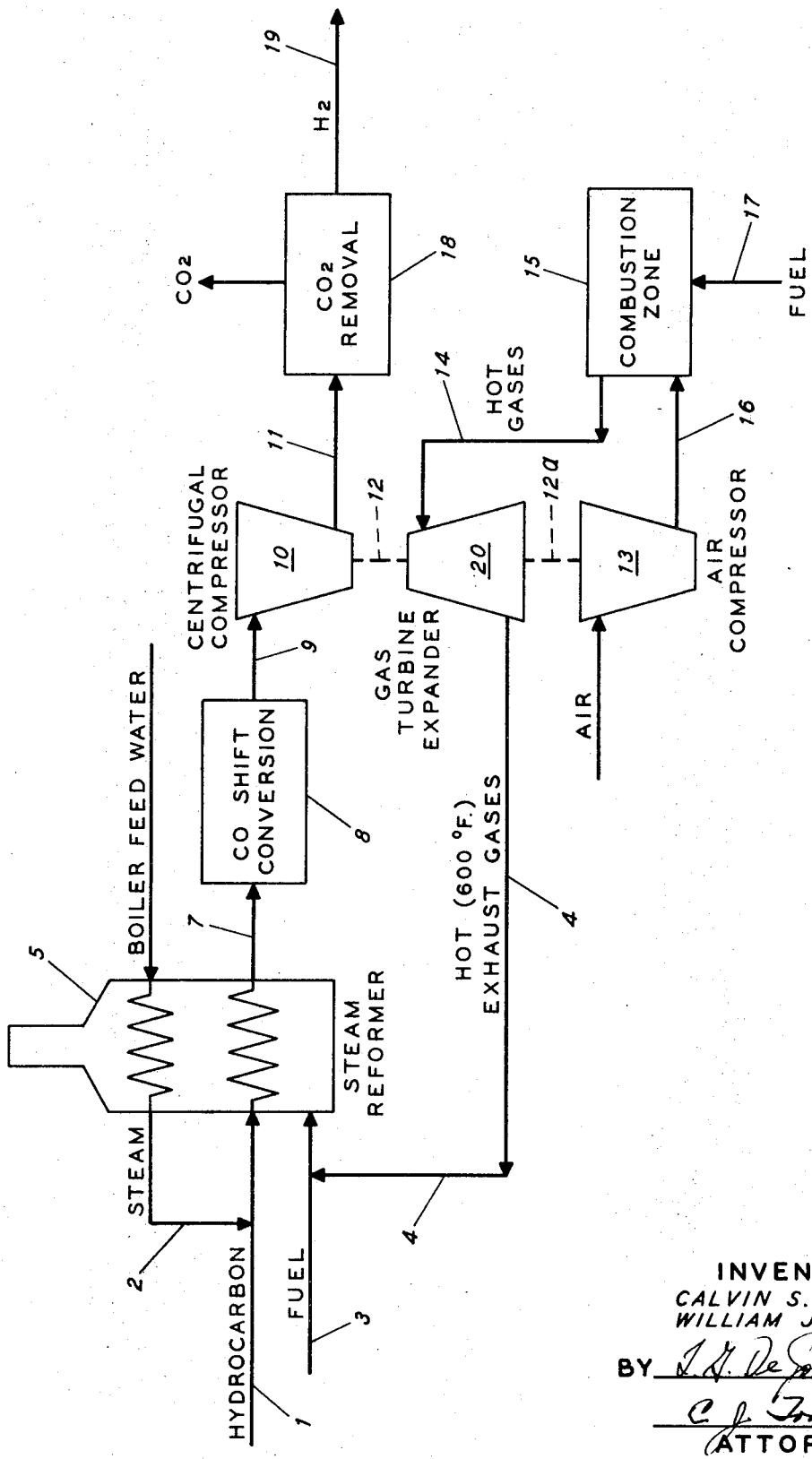

ABSTRACT OF THE DISCLOSURE

A process for producing high pressure hydrogen which comprises:
(a) Reacting a hydrocarbon with steam in a steam reformer to produce $H_2$ and $CO_2$,
(b) Centrifugally compressing at least a portion of the $H_2$ and $CO_2$ in a centrifugal compressor, prior to separating the $CO_2$ from the $H_2$,
(c) Driving the centrifugal compressor by means of a gas turbine driver,
(d) Using air which has been incompletely combusted as motive power for the gas turbine driver, and
(e) Supplying heat for the endothermic reaction of the hydrocarbon with steam in the steam reformer by burning fuel with incompletely combusted exhaust air from the gas turbine driver.

CROSS-REFERENCE TO RELATED APPLICATIONS

This application is a continuation-in-part of Ser. No. 736,520, filed May 17, 1968, which in turn is a continuation-in-part of now abandoned Ser. No. 665,106, filed Sept. 1, 1967, both of which applications are hereby incorporated by reference into the present patent application, particularly that portion of Ser. No. 736,520 and Ser. No. 665,106 relating to centrifugal compression of $H_2$-$CO_2$ gas mixtures followed by removal of the $CO_2$ at least in part by physical absorption of the $CO_2$.

BACKGROUND OF THE INVENTION (1) Field of the invention

This invention relates to processes for the production, compression and purification of gases; and, more particularly, it relates to a process for supplying high pressure, high purity hydrogen gas at elevated pressure. In a still more particular aspect, the invention relates to a process for obtaining high pressure, high purity hydrogen for use in a hydroconversion process. By hydroconversion process is meant a process wherein hydrogen is reacted with hydrocarbons so as to convert the hydrocarbons to more desirable hydrocarbons or hydrocarbon products.

(2) Description of the prior art (A) Means for obtaining raw, hydrogen-rich gas: There are a number of current processes available for the production of raw hydrogen. Many of these processes use hydrocarbons as a source of hydrogen. Two of the most widely practiced methods of obtaining raw, hydrogen-rich gas are steam reforming and partial oxidation.

In typical steam reforming processes, hydrocarbon feed is pretreated to remove sulfur compounds which are poisons to the reforming catalyst. The desulfurized feed is mixed with steam and then is passed through tubes containing a nickel catalyst. While passing through the catalyst-filled tubes most of the hydrocarbons react with steam to form hydrogen and carbon oxides. The tubes containing the catalyst are located in a reforming furnace, which furnace heats the reactants in the tubes to temperatures of 1,200–1,700° F. Pressures maintained in the reforming furnace tubes range from atmospheric to 450 p.s.i.g. If a secondary reforming furnace or reactor is employed, pressures used for reforming may be as high as 450 p.s.i.g. to 700 p.s.i.g. In secondary reformer reactors, part of the hydrocarbons in the effluent from the primary reformer is burned with oxygen. Because of the added expense, secondary reformers are generally not used in hydrogen manufacture but are used where it is desirable to obtain a mixture of $H_2$ and $N_2$, as in ammonia manufacture. The basic reactions in the steam reforming process are:

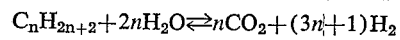

e.g., methane-steam:

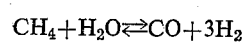

and

Because the hydrogen product is used in high-pressure processes, it is advantageous to operate at high pressure to avoid high compression requirements. However, high pressures are adverse to the equilibrium; and higher temperatures must be employed. Consistent with hydrogen purity requirement of about 95 to 97 volume percent $H_2$ in the final $H_2$ product and present metallurgical limitations, generally the single stage reforming is limited commercially to about 1,550° F. and 300 p.s.i.g.

In typical partial oxidation processes, a hydrocarbon is reacted with oxygen to yield hydrogen and CO. Insufficient oxygen for complete combustion is used. The reaction may be carried out with gaseous hydrocarbons or liquid or solid hydrocarbons. Partial oxidation may be accomplished using air to partially oxidize hydrocarbons and preheated air, at a temperature of 800° F. or higher, is advantageous if available. However, for manufacture of high purity hydrogen it is generally preferable to use essentially pure oxygen rather than air, as the use of air necessitates the removal of nitrogen from the partial oxidation effluent.

(B) $CO_2$ or $CO_2$+$H_2S$ removal: Because most hydrogen-using processes, particularly hydroconversion processes, operate more efficiently with high purity hydrogen, it is generally required to remove impurities, such as $CO_2$, from the raw hydrogen generated in the hydrogen plant before the hydrogen is passed to the hydrogen-using process. Perhaps the most widespread method of removing $CO_2$ from other gases is the absorption of $CO_2$ in an alkanolamine, such as diethanolamine (DEA) or monoethanolamine (MEA). Largely because of its relatively low molecular weight, MEA is generally the preferred absorbent of the alkanolamines. The $CO_2$ forms a loose chemical bond with the amine when it is absorbed.

In using any of the commonly used alkanolamine absorbents, an absorber and stripper are typically arranged in a figure eight process configuration. The $CO_2$-containing gas is fed into the bottom of the absorber where $CO_2$ is absorbed in downward flowing absorbent. Purified gas with the $CO_2$ removed leaves the top of the absorber. Rich absorbent from the bottom of the absorber is passed to the top of a stripping column where it is regenerated as it passes from the top to the bottom of the stripping column. The regenerated absorbent passes from the bottom of the stripper to the top of the absorber to complete the figure eight path of the absorbent as it flows down through the absorber trays, or packing material, absorbing $CO_2$. A large amount of heat is required to strip the $CO_2$ from the MEA absorbent which is typically used because of the chemical bond that occurs between the $CO_2$ and the MEA. For instance, in a large hydrogen plant producing 135×10⁶ standard cubic feet per day of hydrogen, over 300×10⁶ B.t.u.'s per hour are generally required to reboil the MEA in order to effect the regeneration of the MEA. These 300×10⁶ B.t.u.'s per hour are equivalent to over 1,000,000 dollars per year in terms of steam (at a value of about 40 cents per thousand pounds) that could be generated.

Over a period of time, a considerable amount of MEA will be lost out the top of the absorber as large volumes of gas carry entrained MEA out the top of the absorber in spite of preventive measures. Further MEA is lost due to pumping losses as large volumes of absorbent are required and therefore circulated to remove the great quantities of $CO_2$ that are typically formed in modern hydrogen production plants. Other common $CO_2$ absorption systems—for example, hot carbonate—are generally similar to the alkanolamine system in the respects described above with only moderate reduction in regeneration heat requirements.

Since the alkanolamine absorbents tend to degrade, a "reclaimer" is commonly used to purify the absorbent. The reclaimer is essentially a small reboiler. It is fed a slipstream of the absorbent from the bottom of the stripper. Only that portion of the slipstream that is vaporized is returned to the stripper system. Heavy tarry material collects in the bottom of the reclaimer and is periodically withdrawn and passed to sewerage as a spent alkanolamine stream. Common practice is to clean the reclaimer as frequently as once a week. The cleaning procedure typically involves taking the reclaimer off-stream, draining the spent alkanolamine and heavy tarry material, and steam cleaning the reclaimer.

It is thus apparent that cleaning the reclaimer will result in losses of absorbent in addition to those losses caused by entrainment and pumping leakage. Although the alkanolamine is expensive, this cleaning procedure is necessaary to avoid build-up of corrosive bodies in the $CO_2$ absorption system. Corrosion, which would be worse without the reclaimer, still is a considerable problem in the alkanolamine $CO_2$ absorption systems.

(C) Compression of high purity hydrogen: Some of the processes which use high purity hydrogen as a reactant are: hydrodesulfurization, operating at pressures between about 100 and 1,500 p.s.i.g.; hydrotreating, operating at pressures between about 200 and 2,000 p.s.i.g.; hydrocracking, operating at pressures between about 450 and 3,000 p.s.i.g.; and thermal hydrodealkylation, operating at pressures between about 450 and 1,000 p.s.i.g. All of these just-mentioned hydroconversion processes may operate at even higher pressures (for example, up to 10,000 p.s.i.g.) than just given but seldom will operate at pressures lower than the range given. Thus it can be seen that many of the processes which use hydrogen require the hydrogen at a high pressure, which in most cases means generated hydrogen gas must be compressed before being passed to a hydrogen-using process.

Basically, all compressors may be considered as belonging to one of two categories; i.e., their principles involve either that of true mechanical compression (positive displacement) or centrifugal compression. Compressors utilizing true mechanical compression are so considered because the act of volumetric reduction is accomplished by means of a compressing element. The compression element may be in the form of a piston which in its particular motion entraps and displaces gas within a suitably designed and fully enclosed housing. Motion may be reciprocating during which the element, in the form of a piston, passes back and forth within dimensional limits over the same course within a cylinder in a straight-line direction.

Centrifugal compression is accomplished by centrifugal force exerted on an entrapped gas during rotation of an impeller at high speed. Most centrifugal compressors depend primarily on centrifugal force and high tangential velocity of the fluid in the periphery of the impeller (or rotors or blades in the instance of some turbocompressors) to produce the desired head or discharge pressure. In this specification, the terms "centrifugal compression" or "compressor" are meant to include turbine compression or turbocompressors, including, for example, axial-flow compressors. In the broad sense of centrifugal compression used herein, compression is effected, at least to a substantial degree, by conversion of velocity head to pressure head.

The reciprocating compressor is used for hydrogen compression, but it has some severe disadvantages, particularly for large-size plants:

(1) All parts are subject to unbalanced, reciprocating stresses; and foundations, frames and other parts must be large. To minimize vibration, speeds are low (400-700 r.p.m.); and capacity is low. Therefore, in large plants, several machines are required. Cost of installing, instrumenting, protecting and piping several machines is high. Considerable land is required, and plants are bigger and more complex, making them more difficult to control.

(2) The reciprocating machine is less reliable than centrifugal machines, and it is common practice to design plants with one or two expensive spare machines ready to come on-stream in the event of a failure.

(3) The reciprocating machine produces a pulsating gas supply which sonically transmits vibration to piping instruments and other plant facilities. Such vibrations can cause hazardous failures with hydrogen at high pressure.

(4) The low speed of reciprocating compressors tends to limit prime movers to low speed, electric motors or gas engines. While it is possible to use high speed steam or gas turbines, large reduction gears must be used. The pounding of the reciprocating loads has led to poor experience with these units. Hydrocracking and hydrogen manufacturing processes can be designed to produce byproduct steam if it could be used in steam turbine drivers. However, for the reasons just given, this byproduct steam is generally not used to drive the reciprocating compressors.

(5) Reciprocating compressors are particularly susceptible to severe damage if liquid is present in the gas being compressed.

By comparison, centrifugal compressors are reliable, rugged, in most cases relatively simple, have large capacities, are relatively small, have balanced stresses, and generally cause relatively little vibration or pulsation in the plants. They can be driven by high speed, steam turbines or gas turbines.

However, centrifugal compressors cannot, with any reasonable degree of feasibility, be used as high purity hydrogen compressors.

Compression ratios (ratio of discharge pressure to inlet pressure for one stage of compression) obtainable with a centrifugal compressor are a function of the molecular weight of the gas to be compressed. With pure hydrogen having a molecular weight of 2, compression ratios are limited to about 1.025. Because of this low compression ratio for hydrogen, centrifugal compressors are not practical to date for compression of high purity hydrogen.

Table I below illustrates the sharp decrease in compression ratio for centrifugal compression as the molecular weight of the gas being compressed decreases. The number of stages used in the compression is the same for each case in Table I.

TABLE I

| | | | |
|---|---|---|---|
| Barometer, p.s.i.a | 14.4 | 14.4 | 14.4 |
| Inlet temperature, °F | 60.0 | 60.0 | 110.0 |
| k (cp./cv. for inlet gas) | 1.11 | 1.398 | 1.36 |
| Inlet capacity, c.f.m | 20,000.0 | 20,000.0 | 20,000.0 |
| Head, ft.-lb. per lb | 22,000.0 | 22,000.0 | 22,000.0 |
| Molecular weight | 63.0 | 28.95 | 10.0 |
| Inlet pressure, p.s.i.a | 16.73 | 14.73 | 14.08 |
| Discharge pressure, p.s.i.a | 79.53 | 29.73 | 17.99 |
| Compression ratio | 4.75 | 2.01 | 1.28 |

As previously indicated, it is not practical to use centrifugal compressors to compress high purity hydrogen to high pressures because of the multitude of stages that would be required. For example, the centrifugal compression ratio (ratio of discharge pressure to inlet pressure for one stage of centrifugal compression) with hydrogen, molecular weight of 2, is limited to about 1.025. Consequently, over 75 stages of centrifugal compression would be necessary to bring the pressure of hydrogen up to 1,700 p.s.i.g. starting from a pressure of 200 p.s.i.g. On the other hand, two stages of a reciprocating positive displacement compressor could increase the pressure from 200 p.s.i.g. to 1,700 p.s.i.g. Thus, in spite of their problems previously discussed, reciprocating compressors have heretofore been used in bringing high purity hydrogen to high pressure.

British Pat. No. 1,064,182 relates to the production of highly compressed synthesis gas, which is produced by compression of a gas stream in a synthesis gas compressor driven by a gas turbine. According to the process disclosed in British Pat. No. 1,064,182 a first hydrocarbon fuel is burned in a compressed stream of air, the air being in excess of the stoichiometric requirements for the combustion of the hydrocarbon fuel, and then the hot gas stream resulting from such combustion is expanded through a gas turbine. A second hydrocarbon fuel is burned with the gases exhausting from the gas turbine, so as to supply heat for a steam-hydrocarbon reforming reaction. In the reforming reaction a raw synthesis gas stream such as hydrogen methane, and carbon oxides is generated. Nitrogen may be introduced in the synthesis gas stream by burning air with the synthesis gas stream in a secondary reformer, according to the process disclosed in British Pat. No. 1,064,182. A synthesis gas compressor of an undisclosed type is used to elevate the synthesis gas to a high pressure. The synthesis gas might be used, for example, in ammonium synthesis or in methanol synthesis. In either case the average molecular weight of the synthesis gas would be considerably greater than if only a high purity hydrogen gas stream was desired. Although the type of compressor used according to the process of British Pat. No. 1,064,182 is not disclosed, a turbine or centrifugal compressor may be feasible due to the nitrogen or carbon monoxide present in the synthesis gas. Either the nitrogen or carbon monoxide would, of course, act to considerably raise the average molecular weight of the hydrogen gas stream, thus making the average density of the stream to be compressed greater than if it were a pure hydrogen gas stream.

British Pat. No. 1,064,182 discloses the removal of $CO_2$ prior to compressing the synthesis gases. Thus, for the reason given above, the process of British Pat. No. 1,064,182 would not be feasible to bring hydrogen up to high pressures because an unreasonable number of centrifugal compression stages would be needed.

SUMMARY OF THE INVENTION

According to the present invention, a process is provided for producing high pressure hydrogen, which process comprises:

(a) Reacting a hydrocarbon with steam in a steam reformer to produce $H_2$ and $CO_2$, (b) Centrifugally compressing at least a portion of the $H_2$ and $CO_2$ in a centrifugal compressor, prior to separating the $CO_2$ from the $H_2$, (c) Driving the centrifugal compressor by means of a gas turbine driver, (d) Using air which has been incompletely combusted as motive power for the gas turbine driver, and (e) Supplying heat for the endothermic reaction of the hydrocarbon with steam in the steam reformer by burning fuel with incompletely combusted exhaust air from the gas turbine driver.

Preferably the gas mixture comprised of $H_2$ and $CO_2$ which is centrifugally compressed contains sufficient $CO_2$ so that the molecular weight of said gas mixture is at least four. In some instances in the process of the present invention it is desirable to remove a portion of the $CO_2$ present in the hydrogen gas stream generated by steam reforming. However, it is usually preferable that none of the $CO_2$ present in the $H_2$ and $CO_2$ gas generated by steam reforming is removed from the $H_2$ and $CO_2$ prior to centrifugal compression of the $H_2$ and $CO_2$. Of course, a small amount of $CO_2$ may be lost from the hydrogen gas which is generated by steam reforming due to leaks or other merely incidental losses of $CO_2$.

Preferably the centrifugal compressor compresses the $H_2$ and $CO_2$ from a pressure below about 450 p.s.i.g. to a pressure of at least about 900 p.s.i.g. to obtain high pressure $H_2$ and $CO_2$. In accordance with a preferred embodiment of the present invention, the $CO_2$ is removed from the high pressure $H_2$ and $CO_2$ by absorption of the $CO_2$ at a pressure of at least 900 p.s.i.g. in a physical absorbent. A number of advantages are obtained by using centrifugal compression instead of reciprocating compressors as is done in accordance with the prior art for high pressure, high purity hydrogen production. As explained in our earlier application Ser. No. 736,520, the centrifugal compressor affords a number of operating advantages and in particular is advantageous because of its reliability. Also surprising overall economic advantages are obtained by removing the $CO_2$ from the hydrogen gas at high pressure obtained by the centrifugal compression rather than removing the $CO_2$ from the hydrogen at relatively low pressures prevailing prior to compression.

It is particularly advantageous to remove $CO_2$ from the high pressure hydrogen-$CO_2$ gas mixture by physical absorption of the $CO_2$. The physical absorbent may be readily and economically regenerated by reducing the pressure on the absorbent. Previously used low pressure absorbents, particularly those absorbents that formed loose chemical bonds with $CO_2$, required relatively expensive regeneration procedures requiring the use of a substantial amount of steam or other heating medium for the absorbent stripper.

BRIEF DESCRIPTION OF THE DRAWING

The drawing is a schematic flow sheet of a preferred embodiment of the invented process. The schematic flow diagram illustrates the important step of $CO_2$ removal subsequent to centrifugal compression.

DETAILED DESCRIPTION

Referring now in more detail to the embodiment of the invention shown in the drawing, a hydrocarbon feed stream in line 1 is combined with steam in line 2 and introduced to reforming furnace 5 for reaction to produce a raw hydrogen gas. Typically the hydrocarbon feedstock is a light hydrocarbon such as natural gas comprised mostly of methane. The hydrocarbon stream is desulfurized using activated carbon or molecular sieves to adsorb sulfur compounds. If excessive sulfur compounds remain in the feed, the nickel catalyst which is typically used to speed up the kinetics of the reaction of methane with $H_2O$ is poisoned.

Generally the endothermic reforming reaction in reformer furnace 5 takes place at a pressure of about 300 p.s.i.g. and a temperature of about 1500° F. Thus there is substantial heat present in the hydrogen-rich gas containing $CO_2$ and CO withdrawn from the reforming furnace via line 7. This heat is typically removed by heat exchange with boiler feed water so as to generate steam and cool the reformer effluent to a temperature of about 700° F.

The reformer effluent stream at a temperature of about 700° F. is then passed via line 7 to CO shift conversion 8 wherein carbon monoxide is reacted with steam to produce hydrogen and $CO_2$. Preferably shift conversion zone 8 is comprised of a high temperature shift conversion step operating at about 650°–800° F. followed by a low temperature shift conversion step operated at about 350°–

500° F. The high temperature shift conversion step employs an iron-chrome catalyst, and the low temperature shift conversion stage employs a copper-zinc oxide catalyst.

The hydrogen gas steam, now enriched in hydrogen because of the CO shift conversion, is withdrawn from shift conversion zone 8 via line 9 at a temperature of about 350°–500° F. Heat is then removed from the hydrogen-rich gas stream by heat exchange first with boiler feed water and then with process cooling water. The hydrogen gas is passed through a separator wherein liquid condensate which is formed by the cooling is separated from the hydrogen gas. Then the hydrogen gas, which has been substantially freed of water but which still contains the $CO_2$ resulting from reforming in steam reformer 5 and shift conversion in zone 8, is introduced via line 9 to centrifugal compressor 10.

As indicated previously the advantages and many of the other factors pertinent to centrifugal compression prior to complete $CO_2$ removal are disclosed in our application Ser. No. 736,520 which application is incorporated by reference into the present application. Because of the $CO_2$ present in the hydrogen gas feed to centrifugal compressor 10 the molecular weight of the hydrogen gas is sufficient so that centrifugal compression is feasible to obtain high pressure hydrogen, for example 900 p.s.i.g. and above. As explained in our earlier application Ser. No. 736,520, if essentially all of the $CO_2$ is removed prior to compression then the molecular weight of the gas is too low to make the use of centrifugal compressors feasible. Thus reciprocating compressors would be required. Reciprocating compressors, in turn, are not as dependable and in many respects are more expensive than centrifugal compressors. More importantly for purposes of the present invention reciprocating compressors are not amenable to drive by means of a gas turbine driver.

Gas turbine 20 drives centrifugal compressor 10 and air compressor 13 by power transmitted via mechanical linkages 12 and 12a. Gas turbine 20 is, in turn, driven by expanding hot gases which are introduced via line 14 and exhausted from the gas turbine via line 4. The hot gases which are used to drive gas turbine 20 are obtained by partially burning air with fuel in firebox 15. Because the combustion (i.e., consumption of the oxygen content) of the air introduced into firebox 15 via air compressor 13 and line 16, is incomplete, there is a substantial residual amount of oxygen remaining in the resultant hot gases introduced to gas turbine 20 via line 14. Thus, in turn, the expanded exhaust gases from gas turbine 20 contain a substantial amount of oxygen as, for example, 50 to 75% or more of the oxygen in the original air introduced via line 16 to firebox 15. The hot gases from the firebox typically enter gas turbine 13 at a temperature of about 1300 to 1700° F. and exhaust at a temperature of about 800°–1000° F. Seldom do the gases exhaust from gas turbine 13 at a temperature less than about 600° F. Thus there is available from gas turbine 20 an oxygen-containing gas which is preheated and therefore forms an advantageous source of oxidizing gas for burning fuel introduced via line 3 to steam reformer 5.

Integration of the gas turbine and the centrifugal compressors into the process as described above is particularly advantageous because the work energy required to drive compressor 10 is obtained incrementally at high (in the order of 70%) efficiency.

Typically compressor 10 raises the pressure of the hydrogen-$CO_2$ mixture from about 200 p.s.i.g. to a pressure between about 1500 and 3500 p.s.i.g. Thus, a mixture of high pressure hydrogen and $CO_2$ is removed from the centrifugal compressor via line 11. $CO_2$ is removed from the $CO_2$-hydrogen gas mixture at high pressure in $CO_2$-removal zone 18. Preferably the $CO_2$ is removed by absorption of $CO_2$ into a physical absorbent. By physical absorbent is meant an absorbent which may be freed of at least a majority (more than 50% of the $CO_2$) which would be absorbed in the absorption step, by means of reducing the pressure from the absorption pressure down to a substantially lower pressure as, for example, down to a pressure between about atmospheric pressure and 100 p.s.i.g. As discussed in our Ser. No. 736,520 it is surprisingly advantageous to utilize high pressure $CO_2$ removal, particularly using a physical absorbent in conjunction with centrifugal compression of the hydrogen-$CO_2$ gas mixture.

Product hydrogen is withdrawn from $CO_2$-removal zone 18 via line 19. The product hydrogen may be used directly in a hydroconversion unit such as a hydrocracker or a hydrotreater. However, in a typical hydrogen-manufacturing train, hydrogen gases obtained from the $CO_2$-removal zone will be subjected to a methanation step in order to convert some residual amounts of carbon oxides to methane, because the carbon oxides are usually detrimental to the hydrogen conversion process.

Although the process of the present invention is directed to a steam reforming hydrogen manufacturing process, the basic concept of the present invention may also be applied to partial oxidation hydrogen manufacturing process. As discussed previously, preheated air is not generally used in partial oxidation hydrogen production because air contains nitrogen which must be removed from the hydrogen. However hot exhaust air (from a turbine used to drive the hydrogen centrifugal compressor) is advantageously used (i.e., burned with fuel to supply heat) in furnaces to preheat hydrocarbon (e.g., oil or natural gas) and/or oxygen and/or water fed to the partial oxidation reactor.

Although various specific embodiments of the invention have been described and shown, it is to be understood that they are meant to be illustrative only and not limiting. Certain features may change without departing from the spirit or essence of the invention. It is apparent that the present invention has broad application to the production of high pressure hydrogen using a centrifugal compressor which is driven by a gas turbine. Accordingly, the invention is not to be construed as limited to the specific embodiments illustrated but only as defined in the appended claims.

We claim:
1. A process for producing high pressure hydrogen which comprises:
    (a) reacting a hydrocarbon with steam in a steam reformer at a pressure below about 450 p.s.i.g. to obtain a hydrogen-rich gas containing sufficient $CO_2$ so that the molecular weight of the hydrogen-rich gas is at least 4;
    (b) compressing the hydrogen from a pressure below 450 p.s.i.g. in a centrifugal compressor to a pressure of at least 900 p.s.i.g., before the molecular weight of the hydrogen-rich gas is reduced below 4 by $CO_2$ removal, to obtain high pressure hydrogen-rich gas;
    (c) removing $CO_2$ from the high pressure hydrogen-rich gas to obtain high purity high pressure hydrogen, at least part of the $CO_2$ being removed by absorbing $CO_2$ in a physical absorbent;
    (d) driving the centrifugal compressor by means of a gas turbine using air which has been incompletely combusted as motive power for the gas turbine, and
    (e) supplying heat for the endothermic reaction of the hydrocarbon with steam in the steam reformer by burning fuel with incompletely combusted exhaust air from the gas turbine.

2. A process in accordance with claim 1 wherein the hydrogen-rich gas obtained from the steam reformer is fed to a CO shift conversion zone wherein CO present in the hydrogen-rich gas from the reformer is reacted with $H_2O$ to produce additional $H_2$ and $CO_2$ prior to compression of the $H_2$ in accordance with step (b).

3. A process in accordance with claim 1 wherein the hydrogen is centrifugally compressed after partial removal of $CO_2$ from the hydrogen-rich gas generated by steam reforming.

4. A process in accordance with claim 1 wherein none of the $CO_2$ present in the hydrogen-rich gas generated by steam reforming is removed from the hydrogen prior to centrifugal compression of the hydrogen.

References Cited

UNITED STATES PATENTS

| | | | |
|---|---|---|---|
| 3,382,045 | 5/1968 | Habermehl et al. | 23—213 |
| 3,383,838 | 5/1968 | Carson | 55—44 |
| 3,401,111 | 9/1968 | Jackson | 208—108 |
| 3,418,082 | 12/1968 | Ter Haar | 23—213 |
| 3,420,633 | 1/1969 | Lee | 23—210 |

FOREIGN PATENTS

| | | | |
|---|---|---|---|
| 1,064,182 | 4/1967 | Great Britain | 23—212 |

EDWARD STERN, Primary Examiner